(12) United States Patent
Kühne et al.

(10) Patent No.: US 11,260,750 B2
(45) Date of Patent: Mar. 1, 2022

(54) MOBILE SENSOR APPARATUS FOR A HEAD-WORN VISUAL OUTPUT DEVICE USABLE IN A VEHICLE, AND METHOD FOR OPERATING A DISPLAY SYSTEM

(71) Applicant: AUDI AG, Ingolstadt (DE)

(72) Inventors: Marcus Kühne, Beilngries (DE);
Daniel Profendiner, Ingolstadt (DE);
Nils Wollny, Munich (DE)

(73) Assignee: AUDI AG, Ingolstadt (DE)

( * ) Notice: Subject to any disclaimer, the term of this patent is extended or adjusted under 35 U.S.C. 154(b) by 21 days.

(21) Appl. No.: 16/610,808

(22) PCT Filed: Apr. 30, 2018

(86) PCT No.: PCT/EP2018/061015
§ 371 (c)(1),
(2) Date: Nov. 4, 2019

(87) PCT Pub. No.: WO2018/202614
PCT Pub. Date: Nov. 8, 2018

(65) Prior Publication Data
US 2021/0023984 A1    Jan. 28, 2021

(30) Foreign Application Priority Data

May 5, 2017 (DE) .................... 10 2017 207 600.3
May 24, 2017 (DE) .................... 10 2017 208 881.8

(51) Int. Cl.
*B60K 35/00*    (2006.01)
*B60Q 1/26*    (2006.01)
(Continued)

(52) U.S. Cl.
CPC ............ *B60K 35/00* (2013.01); *B60Q 1/2673* (2013.01); *B60R 16/03* (2013.01); *G06F 3/14* (2013.01);
(Continued)

(58) Field of Classification Search
CPC ........... G06T 13/00; G06F 3/14; B60K 35/00; B60K 2370/11; B60K 2370/1529;
(Continued)

(56) References Cited

U.S. PATENT DOCUMENTS 8,708,884 B1 *   4/2014  Smyth .................... A61M 21/00
                                                      600/27
9,274,337 B2 *   3/2016  Meadows .............. B60K 35/00
(Continued)

FOREIGN PATENT DOCUMENTS

DE       100 13 478 A1      9/2001
DE       10013478 A1 *       9/2001   ......... G01C 21/3688
(Continued)

OTHER PUBLICATIONS

German Office Action dated Apr. 12, 2018 from German Patent Application No. 10 2017 208 881.8, 10 pages.
(Continued)

*Primary Examiner* — Jennifer Mehmood
*Assistant Examiner* — Donna J. Ricks
(74) *Attorney, Agent, or Firm* — Staas & Halsey LLP

(57) ABSTRACT

A mobile sensor apparatus includes a capture device for capturing vehicle movements of the vehicle and an interface for transmitting data relating to the vehicle movements to a head-worn visual output device. A display system includes the mobile sensor apparatus and the head-worn visual output device.

19 Claims, 1 Drawing Sheet

(51) Int. Cl.
*B60R 16/03* (2006.01)
*G06F 3/14* (2006.01)
*G06T 13/00* (2011.01)

(52) U.S. Cl.
CPC .......... *G06T 13/00* (2013.01); *B60K 2370/11* (2019.05); *B60K 2370/1529* (2019.05); *B60K 2370/164* (2019.05); *B60K 2370/166* (2019.05); *B60K 2370/177* (2019.05); *B60K 2370/193* (2019.05); *B60K 2370/566* (2019.05); *B60K 2370/573* (2019.05); *B60K 2370/586* (2019.05); *B60K 2370/5905* (2019.05); *B60K 2370/5911* (2019.05)

(58) Field of Classification Search
CPC ........ B60K 2370/164; B60K 2370/166; B60K 2370/177; B60K 2370/586; B60K 2370/5905; B60K 2370/5911; B60K 2370/193; B60K 2370/566; B60K 2370/573; B60K 2370/347; B60K 2370/27; B60K 2370/52; B60K 2370/589; B60Q 1/2673; B60R 16/03; B60R 11/0241

See application file for complete search history.

(56) References Cited

U.S. PATENT DOCUMENTS

| | | | |
|---|---|---|---|
| 9,610,908 B2 | 4/2017 | Siegel et al. | |
| 10,155,482 B2 * | 12/2018 | Corso | H04B 1/3877 |
| 2007/0034212 A1 | 2/2007 | Brendley et al. | |
| 2007/0042709 A1 | 2/2007 | Krieger et al. | |
| 2012/0001843 A1 * | 1/2012 | Gravino | G06F 1/1694 |
| | | | 345/156 |
| 2015/0097861 A1 * | 4/2015 | Alaniz | G06F 3/011 |
| | | | 345/633 |
| 2015/0234186 A1 | 8/2015 | Meadows | |
| 2015/0294505 A1 * | 10/2015 | Atsmon | G06F 3/04815 |
| | | | 345/633 |
| 2016/0048027 A1 | 2/2016 | Shpigelman | |
| 2018/0184014 A1 * | 6/2018 | Goldstein | G06K 9/00791 |

FOREIGN PATENT DOCUMENTS

| | | |
|---|---|---|
| DE | 10 2009 033878 A1 | 1/2011 |
| DE | 10 2014 220053 A1 | 7/2015 |
| DE | 10 2014 019579 A1 | 6/2016 |
| JP | 2005-294954 | 10/2005 |
| JP | 2008-230575 | 10/2008 |
| JP | 2009-56862 | 3/2009 |
| JP | 2013-212748 | 10/2013 |
| JP | 2014-44691 | 3/2014 |
| JP | 2015-105072 | 6/2015 |

OTHER PUBLICATIONS

International Search Report dated Jul. 11, 2018 from International Patent Application No. PCT/EP2018/061015, 4 pages.
10 2017 207 600.3, May 5, 2017, Marcus Kühne et al., AUDI AG.
10 2017 208 881.8, May 24, 2017, Marcus Kühne et al., AUDI AG.
PCT/EP2018/061015, Apr. 30, 2018, Marcus Kühne et al., AUDI AG.
English translation of the International Preliminary Report on Patentability dated Nov. 7, 2019 from International Patent Application No. PCT/EP2018/061015, 9 pages.
Japanese Office Action dated Mar. 2, 2021, in Japanese Patent Application No. 2019-560638, 16 pages including translation.
Korean Office Action dated May 6, 2021 in Korean Patent Application No. 10-2019-7035956, 7 pages.
Examination Report dated Mar. 9, 2021, in Indian Patent Application No. 201917046655 (6 pages).

\* cited by examiner

MOBILE SENSOR APPARATUS FOR A HEAD-WORN VISUAL OUTPUT DEVICE USABLE IN A VEHICLE, AND METHOD FOR OPERATING A DISPLAY SYSTEM

CROSS REFERENCE TO RELATED APPLICATIONS

This application is a U.S. national stage of International Application No. PCT/EP2018/061015, filed on Apr. 30, 2018. The International Application claims the priority benefit of German Application No. 10 2017 207 600.3 filed on May 5, 2017 and German Application No. 10 2017 208 881.8 filed on May 24, 2017. The International Application and the German Application are incorporated by reference herein in their entirety.

BACKGROUND

Described herein is a mobile sensor apparatus for a head-worn visual output device usable in a vehicle and to a method for operating a display system having a mobile sensor apparatus. Further, described herein is a display system having a mobile sensor apparatus and at least one head-worn visual output device.

Increasingly immersive technologies, such as for example virtual reality glasses and the like, will be used in vehicles in the future. In this context, one application scenario to be assumed is that vehicle occupants also want to consume traditional media content such as films, console games and the like or for example surf the internet while traveling, which for the most part takes place on a flat presentation area. In this scenario, the problem of what is known as "simulator sickness" can arise. This problem, which is also referred to as travel sickness, motion sickness or kinetosis, occurs as a result of inconsistencies between sensory impressions relating firstly to the spatial orientation and movement of the body and secondly to visual perception. In other words, if the content displayed by using virtual reality glasses, for example, does not fit the movement perceived by the vehicle occupant while traveling in a motor vehicle, the vehicle occupant can feel sick.

A suitable way for eliminating or at least lessening this effect is presentation of a structure that moves with the direction vector of the relevant vehicle, for example in a peripheral field of vision of a wearer of virtual reality glasses or else augmented reality glasses. By way of example, the wearer looks at a type of central screen, with structures appropriate to the vehicle movement being shown around this central screen.

SUMMARY

Described herein is a method and apparatus to prevent the occurrence of kinetosis, or at least to reduce the risk of occurrence of kinetosis, in a vehicle occupant wearing a visual output device on his head in a particularly simple and reliable manner.

The mobile sensor apparatus for a head-worn visual output device usable in a vehicle includes a detection device for detecting vehicle movements of the vehicle and an interface for transmitting data relating to the vehicle movement to the head-worn visual output device.

In this event, the mobile sensor apparatus is based on the insight that vehicles, in particular older vehicles, are often not equipped with a programming interface, usually shortened to API, by use of which data relating to vehicle movements of the vehicle can be transmitted to or provided for electronic smart glasses, for example. The mobile sensor apparatus is a separate small hardware box that can detect vehicle movements of the vehicle when the sensor apparatus is arranged in the relevant vehicle. The interface of the mobile sensor apparatus can be used to transmit these data that then relate to the vehicle movements to the head-worn visual output device that a vehicle occupant has put on while traveling in the vehicle.

The mobile sensor apparatus can thus be used in a particularly simple manner to provide data relating to the vehicle movements of the relevant vehicle for a head-worn visual output device. In accordance with the approach described at the outset, the head-worn visual output device can then take the provided data, which describe the vehicle movement of the vehicle, as a basis for displaying not only the actual content, such as for example media content, but also structures corresponding to the detected movement of the vehicle, for example in a peripheral display area. This provides a simple and reliable way of preventing a wearer of the visual output device from feeling ill while traveling in a vehicle.

In particular, the mobile sensor apparatus allows a head-worn visual output device, such as e.g. electronic smart glasses, to be used to display a wide variety of information and media content in any vehicles, such as for example motor vehicles or else other vehicles, without a wearer of the visual output device feeling sick as a result. A user of the visual output device merely needs to carry the mobile sensor apparatus, which detects the vehicle movements and supplies data in this regard to the visual output device, which then, as already described, can ensure that a wearer of the visual output device does not feel sick while traveling along in a vehicle and wearing a visual output device.

One advantageous embodiment provides for the detection device to be designed to detect a direction of movement of the vehicle. For example, the detection device is also designed to detect accelerations of the vehicle. These can be detected in any spatial directions. By way of example, when traveling in a motor vehicle, it is possible to detect the direction in which the motor vehicle is currently moving and whether the motor vehicle is currently being speeded up or slowed down. Cornering and associated transverse accelerations can likewise be detected. Furthermore, the detection device is for example designed to detect a position of the vehicle. The detection device can have a GPS module for this purpose, for example. It is thus possible for not just the vehicle movements but also the position of the vehicle to be taken into account during operation of the head-worn visual output device, for example in order to show surroundings information relating to the current position of the vehicle. This can likewise help to reduce the risk of the occurrence of kinetosis. The GPS module can be e.g. in the form of an antenna mountable on the outside of a vehicle, for example in the form of a magnetic roof antenna or the like. The GPS data can be transmitted, for example via a Bluetooth connection, to the remainder of the sensor apparatus, which is in the vehicle. Moreover, the antenna—when not active—is also supposed to be able to be elegantly mounted on the remainder of the sensor apparatus, which can be arranged in the vehicle, magnetically. This allows the antenna and the remainder of the sensor apparatus to be transported together particularly easily. Moreover, it is also possible for the antenna to have a clip by use of which the antenna used as GPS receiver is mountable on a window of a vehicle. The GPS module attachable to the outside of a vehicle allows particularly exact position data to be provided.

A further advantageous embodiment provides for the detection device to have a data interface coupleable to the vehicle for detecting the vehicle movements. The detection device can have an appropriate plug, for example, that can be plugged into an on-vehicle USB interface or else into an on-vehicle diagnosis socket. In this way, the mobile sensor apparatus can be coupled to the vehicle quite easily in order to obtain a wide variety of data concerning the vehicle movements. Moreover, it is also possible for the detection device to be coupled to an on-vehicle main unit, that is to say a data processing device, wirelessly, for example via a WLAN interface provided on the vehicle, the main unit providing selected data concerning the vehicle movements.

Alternatively or additionally, it is also possible for the detection device to have at least one sensor for detecting the vehicle movements. Furthermore, it is also possible for the detection device to be able to provide all of the data relating to the vehicle movement completely independently. This is advantageous in particular when there are no interfaces at all on the vehicle to couple the mobile sensor apparatus for detecting the vehicle movements to the motor vehicle.

In a further advantageous refinement, there is provision for the interface to be designed to transmit the data relating to the vehicle movements to the head-worn visual output device wirelessly and/or by wire. By way of example, the mobile sensor apparatus can transmit the data relating to the vehicle movements via a Bluetooth connection. Further, it is also possible for both the mobile sensor apparatus and the visual output device to be able to be connected to a WLAN provided on the vehicle. In that case, the data relating to the vehicle movements can be transmitted via the WLAN connection. Alternatively or additionally, it is also possible for the mobile sensor apparatus to be able to be connected to the visual output device simply by using a cable in order to transmit the data relating to the vehicle movements to the visual output device. In each case, there is the assurance that the data relating to the vehicle movements can be reliably transmitted to the visual output device.

In accordance with a further advantageous embodiment, there is provision for the mobile sensor apparatus to have the form of a beverage container, in particular a beverage can, that is able to be held in a beverage holder of the vehicle. This allows the mobile sensor apparatus to be held particularly securely, in particular also securely in the event of a crash, on the vehicle. Moreover, this makes it possible to ensure that the sensor apparatus can be firmly fixed in any vehicles particularly simply. This is advantageous for vehicle movements measured by using the sensor apparatus itself. The form of a beverage container, in particular in the case of a standardized can or bottle form, allows the sensor apparatus to be reliably fixed in an on-vehicle beverage holder, specifically without relative movements arising between beverage holder and sensor apparatus. This allows the sensor apparatus to supply particularly good measurement data for the vehicle movements.

A further advantageous embodiment provides for the mobile sensor apparatus to have a battery and/or a plug connectable to the vehicle for supplying power. The supply of power to the sensor apparatus can thus be reliably ensured.

In a further advantageous refinement, there is provision for the mobile sensor apparatus to have a further interface for digital picture and sound transmission, so that digital picture and sound data are receivable by using the mobile sensor apparatus and transmittable to the head-worn visual output device. The further interface can be an HDMI interface, for example. As such, for example a streaming media stick, by use of which films can be wirelessly streamed, can be plugged into the HDMI interface. The mobile sensor apparatus can thus be used to receive film data, for example, and to transmit them to the head-worn visual output device. Alternatively, e.g. a games console can also be connected via the HDMI interface, so that the head-worn visual output device can be used quite simply as an output device for the games console in the vehicle.

The display system includes the mobile sensor apparatus or an advantageous embodiment of the mobile sensor apparatus and at least one head-worn visual output device, which is configured to display a structure corresponding to the detected vehicle movements in a subregion of its display area in order to reduce an inconsistency between visual sensory impressions and sensory impressions relating to the spatial orientation and/or movement of the vehicle occupant for a vehicle occupant wearing the visual output device. The head-worn visual output device is for example virtual reality glasses, augmented reality glasses or an augmented reality lens.

The method for operating the display system or an advantageous embodiment of the display system involves the sensor apparatus being used to detect vehicle movements of the vehicle and to transmit data relating to the vehicle movements to the head-worn visual output device, which displays a structure corresponding to the detected vehicle movements in a subregion of its display area in order to reduce an inconsistency between visual sensory impressions and sensory impressions relating to the spatial orientation and/or movement of the vehicle occupant for a vehicle occupant wearing the visual output device. Advantageous refinements of the method can be regarded as advantageous refinements of the mobile sensor apparatus or of the display system, wherein the mobile sensor apparatus and the display system have features for performing the method operations.

Further advantages, features and details are obtained from the description that follows for various examples and on the basis of the drawings. The features and combinations of features that are cited in the description above and the features and combinations of features that are shown in the description of the drawings below and/or in the drawings alone are usable not only in the indicated combination but also on their own or else in other combinations without departing from the scope of the disclosure.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
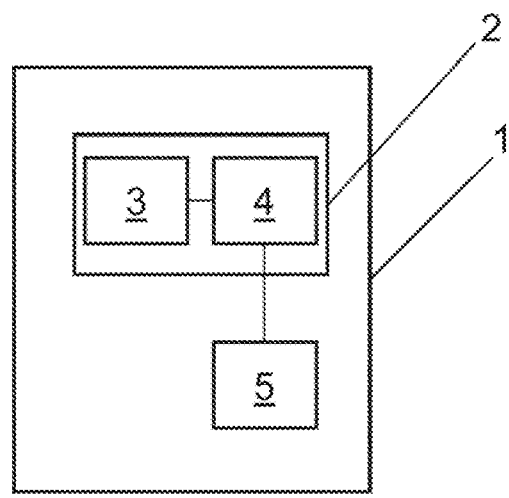
FIG. 1 is a schematic depiction of a display system having a mobile sensor apparatus and electronic smart glasses, wherein the mobile sensor apparatus is designed to detect vehicle movements of a vehicle and to provide data in this regard to the electronic smart glasses.

Reference will now be made in detail to examples which are illustrated in the accompanying drawings, wherein like reference numerals refer to like elements throughout.

A display system 1 having a mobile sensor apparatus 2 is shown in a schematic depiction in FIG. 1. The mobile sensor apparatus 2 includes a detection device 3 for detecting vehicle movements of a vehicle and an interface 4 for transmitting data relating to the vehicle movements to electronic smart glasses 5 of the display system 1. The electronic smart glasses 5 can be for example virtual reality glasses or else augmented reality glasses. Instead of the electronic smart glasses 5, however, it is also possible for other head-worn visual output devices to be used, for example including one or more augmented reality lenses.

Vehicle occupants, in particular if they are passengers, can put on the electronic smart glasses 5 in order to have a wide variety of content, for example media content such as films and the like, console games or else internet pages, displayed while traveling. While traveling in the vehicle, a wearer of such electronic smart glasses 5 can feel sick, in particular the greater the discrepancy between the visual sensory impressions on the basis of the content being shown by using the electronic smart glasses 5 and the sensory impressions that relate to the spatial orientation and movement of the wearer of the electronic smart glasses 5.

The mobile sensor apparatus 2 is a separate hardware box that can be used in any vehicles. The detection device 3 can be used to detect a wide variety of variables relating to the vehicle movements of the vehicle and to transmit applicable data via the interface 4 to the electronic smart glasses 5. The detection device 3 can detect a direction of movement of the vehicle, for example. Similarly, the detection device 3 can also detect accelerations of the vehicle. Further, the detection device 3 can also detect a position of the vehicle. The detection device 3 can have for example a data interface coupleable to the relevant vehicle for detecting the vehicle movements. As such, the detection device 3 can be plugged for example into an onboard interface of the vehicle or else simply into a USB interface in order to detect the different vehicle movements. Alternatively or additionally, it is also possible for the detection device 3 to have one or more sensors for detecting the vehicle movements. In particular, it is also possible for the mobile sensor apparatus 2 to be able to detect respective vehicle movements completely independently of vehicles. In that case, the mobile sensor apparatus 2 is designed to have an appropriate sensor system by use of which movements and accelerations and possibly also position information can be collected independently.

The interface 4 can be either a wireless or a wired interface. By way of example, the data relating to the vehicle movement can be transmitted to the electronic smart glasses 5 via a Bluetooth connection, a WLAN connection or else via a mobile radio connection. Alternatively or additionally, it is also possible for simply a cable connection to be made between the mobile sensor apparatus 2 and the electronic smart glasses 5, for example by simply plugging a USB cable into the electronic smart glasses 5.

The mobile sensor apparatus 2 can have for example the form of a beverage can, so that the mobile sensor apparatus 2 can be reliably and securely held and kept in a beverage holder of the relevant vehicle. Even with a faster driving style and abrupt driving maneuvers, this makes it possible to ensure that the mobile sensor apparatus 2 is kept securely in the vehicle. To supply power to the mobile sensor apparatus 2, the latter for example includes a battery. Additionally, the mobile sensor apparatus 2 can be connected to the relevant vehicle by using a plug, for example, so that the mobile sensor apparatus 2 can also be supplied with power by using the plug, the battery of the mobile sensor apparatus 2 furthermore also being able to be charged in that way.

Figure 2:
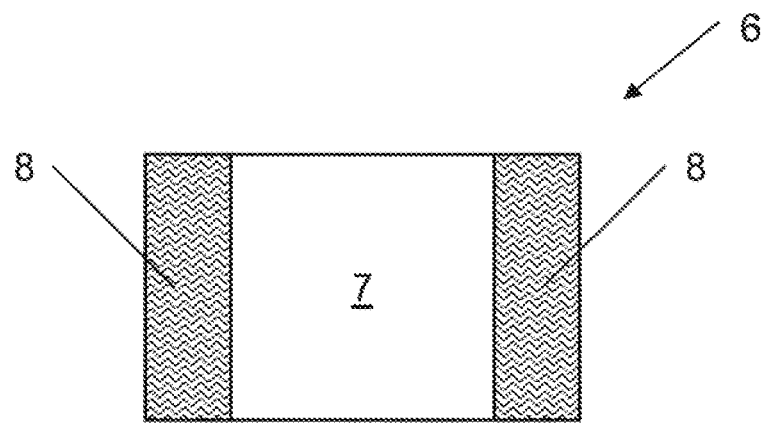
FIG. 2 is a schematic depiction of a display area of the electronic smart glasses, wherein structures are displayed in a lateral peripheral region of the display area in accordance with the detected vehicle movements in order to prevent the occurrence of nausea in a vehicle occupant wearing the electronic smart glasses in the vehicle.

FIG. 2 schematically depicts a display area 6 of the electronic smart glasses 5. First, a central display region 7 can be seen; secondly, peripheral lateral display regions 8 are moreover also depicted to the left and right thereof. On the basis of the data relating to the movements of the vehicle that are provided by using the mobile sensor apparatus 2, structures corresponding to the detected vehicle movements are displayed in the laterally peripheral display regions 8. This allows inconsistencies between visual sensory impressions and sensory impressions relating to the spatial orientation and/or movement of the vehicle occupant to be reduced or completely resolved for a vehicle occupant wearing the electronic smart glasses 5.

As such, a vehicle occupant wearing the electronic smart glasses 5 can watch a film or else see content of a video game, for example, in the central display region 7. The laterally peripheral display regions 8 are used to display structures, such as for example arrows or else other symbols, that move in the manner corresponding to the detected vehicle movement. If the vehicle in which the vehicle occupant wearing the electronic smart glasses 5 is sitting is accelerated really hard, for example, then the displayed structures in the peripheral regions 8 are likewise accelerated hard. If, by contrast, the vehicle is abruptly slowed down, then the movement of the displayed structures in the peripheral display regions 8 is likewise greatly slowed down. The visual clarification of the current vehicle movements is naturally not just limited to the display in such lateral peripheral display regions 8.

The shape of the cited structures is substantially also arbitrary. It is only important that the wearer of the electronic smart glasses 5 is provided with visual feedback about how the relevant vehicle, and hence the wearer himself too, is moving. This allows the occurrence of what is known as simulator sickness, which is also referred to as travel sickness, motion sickness or kinetosis, to be considerably reduced or completely prevented.

Naturally, further applications converting the natural movement of the vehicle into the content shown by using the electronic smart glasses 5 are also possible on the basis of the data relating to the vehicle movement. The mobile sensor apparatus 2 can in particular work completely independently of the vehicle in which the mobile sensor apparatus 2 is used. A user thus merely needs to bring along the electronic smart glasses 5 and the mobile sensor apparatus 2 to the relevant vehicle. He can then use the electronic smart glasses 5 to display a wide variety of content while traveling in the relevant vehicle, the mobile sensor apparatus 2 detecting vehicle movements in the manner described and providing data in this regard to the electronic smart glasses 5, so that the occurrence of nausea in the wearer of the electronic smart glasses 5 can be considerably reduced or completely prevented.

A description has been provided with reference to examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A mobile sensor apparatus for a head-wearable visual output device usable in a vehicle, comprising:
   a detector configured to detect vehicle movements of the vehicle, the detector including an antenna which is detachable from the mobile sensor apparatus and mountable on the vehicle, and is detachable from the vehicle and mountable on the mobile sensor apparatus; and an interface configured to transmit data relating to the vehicle movements detected by the detector, to the head-wearable visual output device, wherein the mobile sensor apparatus is a portable device separate from the vehicle, is connectable to the vehicle to detect the vehicle movements of the vehicle, and is removable from the vehicle so as to be connectable with another vehicle, and the mobile sensor apparatus is configured to wirelessly receive position data of the vehicle when the antenna is detached from the mobile sensor apparatus and mounted on the vehicle.

2. The mobile sensor apparatus as claimed in claim 1, wherein the detector is configured to detect a direction of movement of the vehicle.

3. The mobile sensor apparatus as claimed in claim 1, wherein the detector is configured to detect an acceleration of the vehicle.

4. The mobile sensor apparatus as claimed in claim 1, wherein the detector has a data interface coupleable to the vehicle to detect the vehicle movements via at least one of a wired connection through a USB interface, a wired connection through an on-vehicle diagnosis socket, or a wireless connection to an on-vehicle data processing device.

5. The mobile sensor apparatus as claimed in claim 1, wherein the detector has at least one sensor to detect the vehicle movements.

6. The mobile sensor apparatus as claimed in claim 1, wherein the interface is configured to transmit the data relating to the vehicle movements to the head-wearable visual output device wirelessly and/or by wire.

7. The mobile sensor apparatus as claimed in claim 1, wherein the mobile sensor apparatus is cylinder-shaped so as to be held in a beverage holder of the vehicle.

8. The mobile sensor apparatus as claimed in claim 1, further comprising a battery and/or a plug connectable to the vehicle to receive power.

9. The mobile sensor apparatus as claimed in claim 1, further comprising a further interface configured to receive digital data and sound data, and configured to transmit the digital data and the sound data to the head-wearable visual output device.

10. A display system, comprising:
a mobile sensor apparatus including:
a detector configured to detect vehicle movements of a vehicle, the detector including an antenna which is detachable from the mobile sensor apparatus and mountable on the vehicle, and is detachable from the vehicle and mountable on the mobile sensor apparatus, and an interface configured to transmit data relating to the vehicle movements detected by the detector, wherein the mobile sensor apparatus is a portable device separate from the vehicle, is connectable to the vehicle to detect the vehicle movements of the vehicle, and is removable from the vehicle so as to be connectable with another vehicle, and the mobile sensor apparatus is configured to wirelessly receive position data of the vehicle when the antenna is detached from the mobile sensor apparatus and mounted on the vehicle; and a head-wearable visual output device configured:
to receive the data relating to the vehicle movements detected by the detector and transmitted from the interface, and to display a structure corresponding to the vehicle movements detected by the detector in a subregion of a display area of the head-wearable visual output device, to reduce an inconsistency between visual sensory impressions and sensory impressions relating to spatial orientation and/or movement of a vehicle occupant wearing the head-wearable visual output device.

11. The display system as claimed in claim 10, wherein the head-wearable visual output device includes at least one of virtual reality glasses, augmented reality glasses, or an augmented reality lens.

12. The display system as claimed in claim 10, wherein the head-wearable visual output device is configured to display media content in a central region of the display area, and the subregion of the display area, which displays the structure, is located peripherally to the central region of the display area.

13. The display system as claimed in claim 10, wherein the detector includes a global positioning system module to detect position data of the vehicle.

14. The display system as claimed in claim 10, wherein the detector includes at least one sensor to detect the vehicle movements of the vehicle, without receiving vehicle movement data from the vehicle.

15. The display system as claimed in claim 10, wherein the mobile sensor apparatus further includes another interface configured to receive digital data and sound data corresponding to media content, and configured to transmit the digital data and the sound data corresponding to the media content, to the head-wearable visual output device, and the head-wearable visual output device is configured:
to receive the digital data and the sound data corresponding to the media content and transmitted from the another interface, and to display the media content in a main region of the display area, separately from the structure displayed in the subregion of the display area.

16. The display system as claimed in claim 10, wherein the interface includes at least one of a Bluetooth connection, a WLAN connection, a mobile radio connection, and a cable connection to transmit the data relating to the vehicle movements detected by the detector.

17. The display system as claimed in claim 10, wherein the structure corresponding to the vehicle movements includes at least one symbol which moves on the subregion of the display area in a manner corresponding to the vehicle movements detected by the detector.

18. A method for operating a display system, comprising:
detecting, by at least one detector of a mobile sensor apparatus, vehicle movements of a vehicle, wherein
the detector includes an antenna which is detachable from the mobile sensor apparatus and mountable on the vehicle, and is detachable from the vehicle and mountable on the mobile sensor apparatus, and the mobile sensor apparatus is a portable device separate from the vehicle, being connectable to the vehicle to detect the vehicle movements of the vehicle, and being removable from the vehicle so as to be connectable with another vehicle;

wirelessly receiving position data of the vehicle when the antenna is detached from the mobile sensor apparatus and mounted on the vehicle;

transmitting, by the mobile sensor apparatus, data relating to the vehicle movements detected by the at least one detector, to a head-wearable visual output device; and displaying a structure corresponding to the vehicle movements detected by the at least one detector in a subregion of a display area of the head-wearable visual output device, to reduce an inconsistency between visual sensory impressions and sensory impressions relating to spatial orientation and/or movement of a vehicle occupant wearing the head-wearable visual output device.

19. A mobile sensor apparatus for a head-wearable visual output device usable in a vehicle, comprising:

a detector configured to detect vehicle movements of the vehicle, the detector including an antenna which is detachable from the mobile sensor apparatus and mountable on the vehicle, and is detachable from the vehicle and mountable on the mobile sensor apparatus; and an interface configured to transmit data relating to the vehicle movements detected by the detector, to the head-wearable visual output device, wherein the mobile sensor apparatus is configured to wirelessly receive position data of the vehicle when the antenna is detached from the mobile sensor apparatus and mounted on the vehicle.

* * * * *